March 17, 1970     M. F HUGHES ET AL     3,501,517
FLUID-BED QUENCHING AMMOXIDATION REACTION
PROCESS FOR NITRILE PREPARATION
Filed March 8, 1965     2 Sheets-Sheet 2

INVENTORS
MACK F. HUGHES
JOHN R. B. ELLIS

BY    ATTORNEY
AGENT

United States Patent Office 3,501,517
Patented Mar. 17, 1970

3,501,517
FLUID - BED QUENCHING AMMOXIDATION REACTION PROCESS FOR NITRILE PREPARATION
Mack F. Hughes, Albany, and John R. B. Ellis, Kentfield, Calif., assignors to Chevron Research Company, a corporation of Delaware
Continuation-in-part of application Ser. No. 294,838, July 15, 1963. This application Mar. 8, 1965, Ser. No. 437,674
Int. Cl. C07c *151/50, 121/30, 121/02*
U.S. Cl. 260—465                                              3 Claims

ABSTRACT OF THE DISCLOSURE

A fluid-bed reaction system is used both as a reaction quenching means and as a reactor. Air, ammonia and hydrocarbon feed, one or more of which is preheated, are contacted concurrently in the fluid bed and a local short duration ammoxidation condition is generated. An indirect heat exchanger located in the dense phase of the fluid bed maintains the quenching temperature in the balance of the bed resulting in short contact times at ammoxidation temperatures and substantial reductions in overoxidation, i.e., improved selectivities for the production of nitriles.

---

Figure 1A:
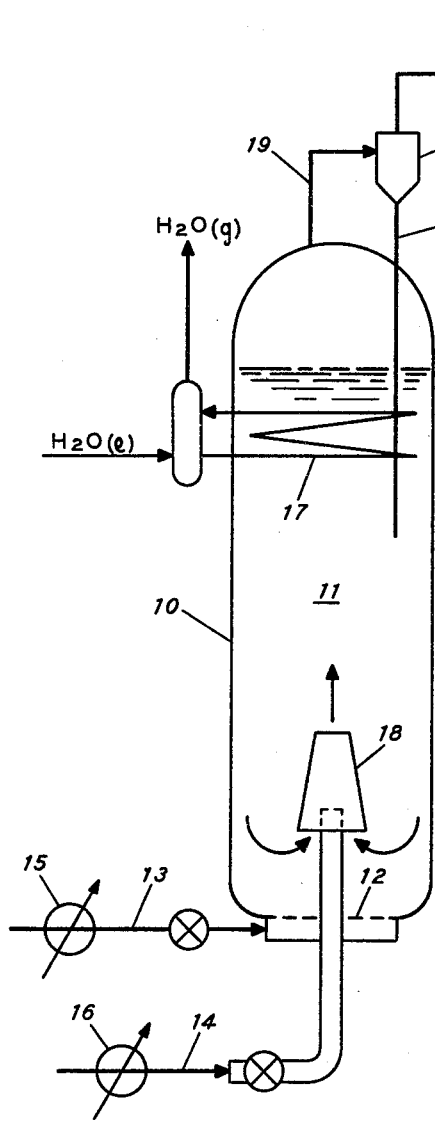

This application is a continuation-in-part of John R. B. Ellis and Mack F. Hughes U.S. application Ser. No. 294,838, filed July 15, 1963, now U.S. Patent No. 3,351,634.

This invention relates to an improved method for partially oxidizing organic compounds in the vapor state by generating a local oxidizing condition in the dense phase of a fluid-bed otherwise operating under reaction-quenching conditions. More particularly, this invention relates to a new and improved fluid-bed process for the vapor-phase catalyzed ammoxidation of hydrocarbons.

Fluidized ebullient solid-bed reaction systems are well known for the excellence of their temperature control characteristics. Temperature control in the vapor-phase oxidation and ammoxidation art is and has been a particular source of difficulty in that these reactions are highly exothermic and frequently subject to runaway reactions, over-oxidation, and the acceptance of undesirable limitations as a consequence of the foregoing problems. Inherently in the past, satisfactory fluid-bed operation has meant the acceptance of contact times at reaction temperatures of the order of one second and higher, and usually of the order of 5 to 30 seconds. Under these conditions, oxidizable vaporized organic compounds are usually found to be over-oxidized, resulting in inferior yields and in the conversion of costly feed materials, in large part, to useless carbon dioxide and of ammonia to nitrogen.

It is now found that selective partial ammoxidation of hydrocarbons may be effected in the dense phase of a suspended catalyst bed maintained in an ebullient and suspended form by a gaseous maens provided that there is a cooling means in indirect contact with said dense phase, thereby to maintain the bulk of the fluid-bed catalyst at a controlled temperature below the effective reaction temperature of the desired ammoxidation reaction. In the process, the organic feed to be ammoxidized is preheated to ammoxidation initiating reaction temperatures and introduced directly into the dense phase of the fluid catalyst bed, and concurrently into contact with the ammoxidizing gas stream and the catalyst. The desired ammoxidation reaction is effected within a limited reaction zone and promptly quenched by the differential temperature of the surrounding catalyst phase. Thereafter the resultant ammoxidation product passes downstream and is disengaged from the catalyst bed and recovered from the effluent vapors.

In a more particular form of the process, vaporized ammoxidizable organic compounds, preferably hydrocarbons, are efficiently converted to corresponding nitrile products by (1) heating by a suitable means the dense phase of a fluid-bed reaction system to a temperature $T_1$ defined by the expression:

$$T_1 = T_2 - Y$$

in which $T_2$ is the fluid-bed temperature at which incipient partial oxidation occurs, but at not more than about a 10% conversion, when a gaseous mixture consisting of the ammoxidizable organic compound, air and ammonia having a mole ratio of organic compound, oxygen and ammonia of about 1:3:2, respectively is introduced at $T_2$ into the fluid-bed at a linear velocity of 2 ft./sec., in which $Y$ is a temperature differential in degrees Fahrenheit in the range from about 100 to 400° F., in which the fluidized solid may be a vapor-phase ammoxidation catalyst, or a mixture of inert and catalytic solids, and wherein the temperature $T_1$, is maintained in the fluid-bed by a suitable indirect heat exchanger in contact with a portion of the fluidized bed dense phase; (2) thereafter separately introducing into the fluidized-solid dense phase the vaporized ammoxidizable hydrocarbon, at least one molecular oxygen-containing gas stream and at least one ammonia-containing gas stream, wherein at least one of the intromittent gas streams is introduced at a temperature in the range of from about 150 to 500° F. higher than the temperature $T_2$ of the foregoing expression, thereby locally generating within the zone of initial common contacting of the hydrocarbon compound, oxygen-containing gas, ammonia, and fluidized solid, a local oxidizing condition; and (3) from the resulting reaction-product containing gas stream recovering the corresponding nitrile ammoxidation products. A feature of the process is the accomplishmnet of partial ammoxidation in the foregoing manner with fluid-bed contact times at ammoxidizing temperatures of the order of 0.01 second and shorter in fluidized-solid beds having depths of the order of from 3 to 30 feet.

By ammoxidation is meant the partial oxygen oxidation of a hydrocarbon in the presence of ammonia whereby an organic nitrile is produced.

By incipient partial ammoxidation temperature is meant one in which for a given fluid-bed reaction system, including hydrocarbon feed, catalyst, and the ammonia-oxygen ammoxidation gas mixture, at least about 0.1, but less than about 10% of the feed is converted to partially oxidized product or intermediates, that is with the bed operating in the conventional prior art manner. In general, the temperature $T_2$, corresponding to conversions within the above range, in its application in the above-defined formula, $T_1 = T_2 - Y$, will establish a fluid-bed operating temperature, $T_1$, which is reaction quenching.

In the process, the introduction of the molecular oxygen-containing gas is air or oxygen-enriched air, into the fluid-bed dense phase is by a separate stream in order that explosion hazards may be avoided. Where the desired oxidation gas stream feed would not be an explosive mixture at the desired input temperature, separate introduction is, of course, not necessary.

Where separate introduction of the feed components is necessary or desirable, the actual introduction and mixing of the reactants into the dense phase must be in such a manner that effective and substantially immediate localized heat energy exchange occurs between the reaction components, feed, fluidized catalyst, ammonia, and molecular oxygen. Surprisingly, the fluidized solid of the bed acts substantially in the manner of a gas that such an exchange is feasible. In this exchange, there is momentarily induced locally in the fluid-bed an ammoxidizing temperature condition which is of short duration because the fluid-bed, except for the localized transient condition, is maintained at a reaction quenching temperature. Usually in order to generate the oxidizing condition, the vaporized hydrocarbon feed, or this feed diluted with an inert carrier gas, is preheated to a temperature sufficiently superior to the general fluid-bed temperature to generate the local oxidizing temperature in the bed. An alternative mode, where the feed is temperature sensitive is to preheat a gas stream, other than the oxidizable feed, such as the oxygen-containing gas or the ammonia-containing gas stream. Usually, however, to simplify the operation, the ammonia and hydrocarbon can be simultaneously fed in a single mixture into the bed.

In general, and for efficient operation, the above considerations presuppose the use of in-bed gas distribution system, such as grid-type distributors, multiple-nozzle distributors, and with external headers, single and multiple injection nozzles with in-bed impinging jet streams. In order to maintain superheat gas injection temperatures and to minimize premature heat transfer to the fluid-bed suitable insulating means are employed, including materials of construction, such as low heat transfer ceramics, jacketing, and the like.

Figure 2A:
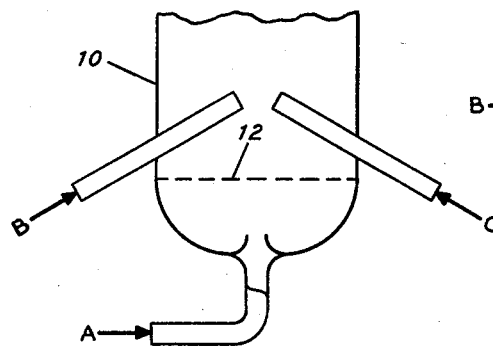
Figure 2D:
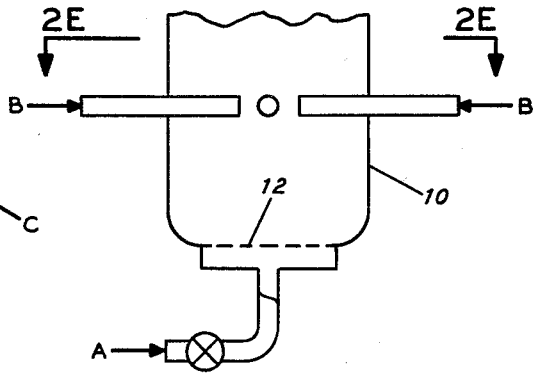
Figure 2B:
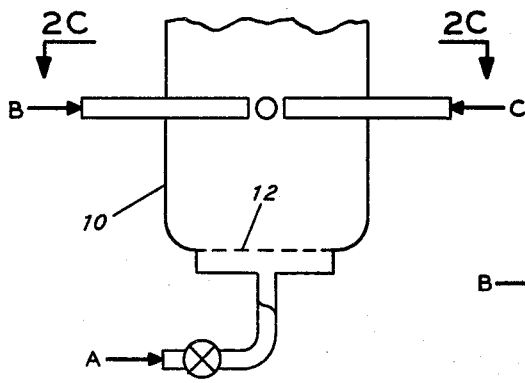
Figure 2E:
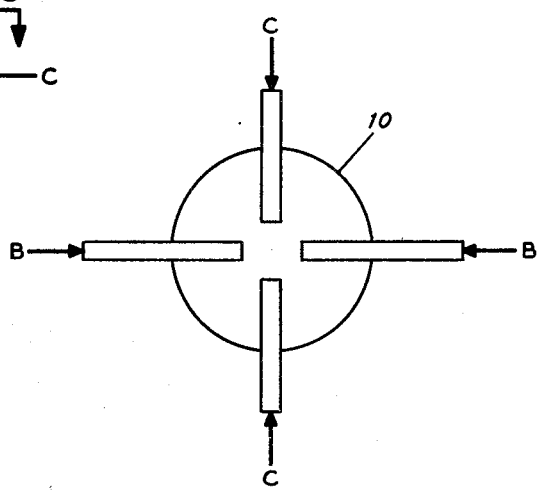
Figure 2C:
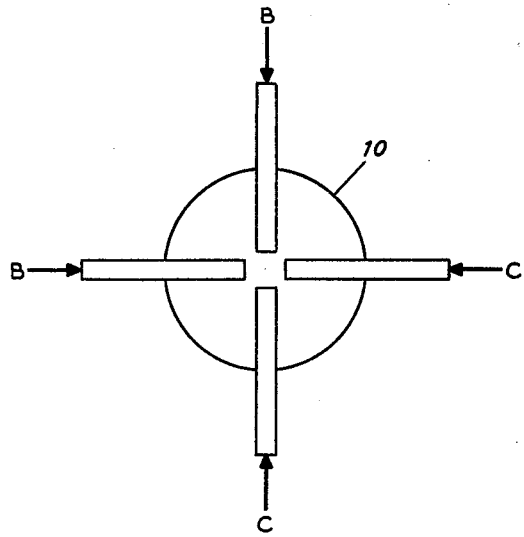

Representative injection systems are shown in FIGS. 2A–2E, inclusive, in which lines marked A are employed for the introduction of the fluidizing gas medium, usually air or an inert gas, lines B are for the introduction of vaporized feed, and lines C are for the introduction of air, oxygen, or the like. Thus, FIG. 2A represents basal admission of fluidizing gas and lateral admission of separate feed and oxidizing gas streams directed to impinge in the fluid-bed. FIG. 2B and FIG. 2C represent peripheral admission of multiple impinging feed and oxidizing gas streams. FIGS. 2D and 2E represent peripheral admission of multiple feed lines with the oxidizing gas stream being wholly supplied by the fluidizing gas.

In addition to the fluidized bed and the separate gaseous feed distribution elements, the process requires an efficient heat exchange means in contact with the dense phase (also known as the continuous phase) of the ebullient bed. Such means must be an indirect heat exchanger capable of maintaining the desired subreaction temperature in the majority of the bed, must not interfere particularly with the ebulliation of the fluid-bed, and depending upon the specific reaction system employed will vary in distance from the localized oxidation zone from 1 to 6 feet and even further.

Above the fluidized bed desirably is left a free space to facilitate disengagement of the product-containing gas stream from the solid bed. A cyclone or filter for the entrapment and return of fine solids contained in the gas stream to the fluid-bed proper is also desirable. Other auxiliary elements can include a means to remove and add portions of the fluidized solid, such as for renewal, catalyst regeneration, or other appropriate treatments.

In general, the incipient oxidation temperature, $T_2$, of the above formula will vary depending upon the nature of the particular feed material, being higher for oxidation-resistant materials, such as methane, ethane, propane, butane, and the like and lower for the more easily ammoxidizable feeds such as propene, butene, isobutene, toluene, m-xylene, o-xylene, p-xylene, misitylene, α-methyl-naphthalene, 1,2-dimethyl naphthalene, 2,4-dimethyl naphthalene, as well as 1,3-, and 1,4-dimethyl naphthalenes, and the like. Partially oxidized hydrocarbons such as benzaldehyde, propionaldehyde, benzyl alcohol, and the like are also useful feeds but in view of their relatively high cost with respect to toluene, propene, etc. are less desirable feeds.

The temperature $T_2$ of the above formula varies depending upon the feed compound and the particular catalyst used. The more active the catalyst, in general, the lower will be the value of $T_2$. Usually $T_2$ will be a temperature in the range from about 400 to 800° F.

The temperature differential, Y, which is desirably used to establish the fluidized-solid bed operating temperature for a given process feed and its resulting product, varies. It must be at least about 100° F. in order that the resulting temperature, $T_1$, be a reaction-quenching temperature. It must not be so large that its establishes a temperature, $T_1$, which is less than the dew point of the reaction product mixture. In general, Y will be in the range from about 100° F. to about 400° F.

In general, the local oxidizing temperature in the bed will be in the range 700 to 1100° F. depending upon the nature of the feed and its relative ease of oxidation.

For reasons of cost, air, in particular, is contemplated as the molecular oxygen-containing gas. Oxygen in admixture with any inert gas, for example nitrogen, steam or the like, is useful provided the oxygen does not exceed about a 50 mole percent fraction of the gas.

In terms of the feed compound to be oxidized, the useful mole ratio ranges of feed:oxygen:ammonia are 1:0.5–50:1–16 respectively.

As feed stocks for the process, all vaporizable ammoxidizable hydrocarbons are contemplated. Since the ammoxidation reaction is an oxidative attack upon aliphatic carbon, the contemplated feed compounds must have at least one aliphatic carbon per molecule. Thus, methane yields hydrogen cyanide, toluene yields benzonitrile, p-xylene yields terephthalonitrile and p-tolunitrile, propene yields acrylonitrile, propane yields propionitrile, etc.

In the present invention, neither the feed compounds nor the solid ammoxidaton catalysts constitute novel elements but the use of these elements, i.e., feed and catalysts, as known in the vapor-phase ammoxidation art is contemplated in the novel quenching fluid-bed system herein described.

In general, the reaction products obtained will be the same in the present process as are obtained in the known vapor-phase fixed bed and conventional fluid-bed ammoxidation reaction systems.

As catalyst for the process, all known solid vapor-phase ammoxidation catalysts are contemplated in the form of fluidized solids. In particular, the metal oxides of vanadium, molybdenum, chromium, mixtures of the foregoing, tin, and other modifications as known in the vapor-phase oxidation art are contemplated. These catalytic materials may be employed per se or as supported upon inert materials, such as alumina, silica, silicon carbide, and the like, when sized to fluid-bed operating requirements, that is in graded sizes within the range from about 1 to 1000 microns, preferably from 10–500 microns and more desirably from about 10–100 microns, with minor portions being in the range 10–20 and 80–100, and the major portion being in the range 20–80 micron particle sizes.

In the form of microspheres, the fluidized catalysts are particularly effective.

Figure 1B:
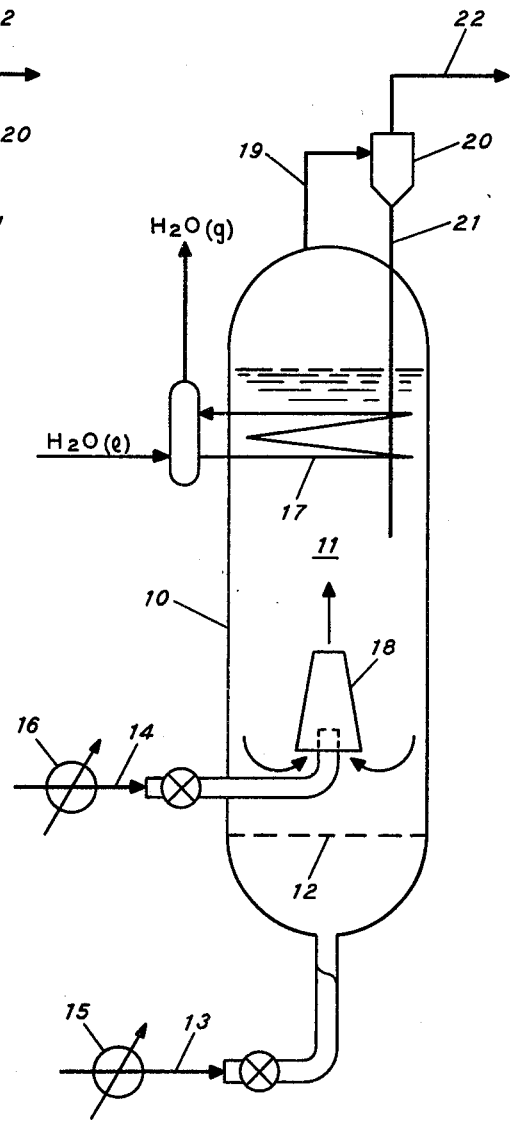

The invention will be more clearly understood from the following detailed description read in conjunction with the accompanying drawings, wherein FIGS. 1A–1B illustrate in schematic form one method for carrying out the invention, and FIGS. 2A–2E exemplify additional forms of reactor feed injector representations.

In the following description, the process is described in use for the production of isophthalonitrile from m-xylene. The catalyst is a fused vanadium oxide initially in the form of $V_2O_5$ microspheres, which in use reach a somewhat lower oxidation state. It is to be understood that this invention is not limited to any particular catalyst composition, to any particular feed, or to any particular type of apparatus.

Referring, therefore, to FIG. 1, there is provided a reactor which is an essentially vertical chamber 10 capable of containing at elevated temperatures an operating ebullient fluidized-solid bed having a diameter in the range from about 2 inches up to 10 feet and larger, and having a vertical height of from about 3 to 30 feet, plus about 10% of the expanded fluid-bed depth for free space above the bed, containing the bed of fluidized solids 11, as well as a base grid 12, connecting inlet gas stream headers 13 and 14, inlet line appurtenant elements, such as temperature control elements 15 and 16, a fluid-bed temperature control means 17 located in the continuous fluid-bed phase, a reaction zone holder 18, an exit header 19, a cyclone 20 for the disengagement of catalyst fines from the effluent gas stream, a line to return the thus recovered fines to the reaction zone proper 21, and an exit header line 22 for the delivery of the reaction product-containing gas stream to the product recovery facility. While the heat exchange means 17 is shown as a steam generator coil located in the downstream portion of the fluid bed, other equivalent heat exchange means may be employed to maintain the general fluid-bed temperature, $T_1$, and said exchanger(s) can be located in closer approximation to the reaction zone holder, so long as the exchanger does not seriously interfere with the generation of the local oxidizing conditions and with the maintenance of the fluid-bed in a normal fluid-bed operating condition. While the reaction zone holder 18 is indicated as being a truncated cone with the inferior base as the exit port for the reaction product mixture, said holder may also be a section of pipe, may be in the form of a Venturi nozzle, or an open-ended box or the like. Advantageously, the reaction zone holder is constructed of materials having a relatively low heat transfer ability, for example of a ceramic material, and similarly the inlet header lines which permit the introduction of superheated gas streams are preferably constructed of materials having low heat transfer ability or are adequately insulated. While FIG. 1 shows but a single inlet header and reaction zone holder, it is not intended that this invention be so limited, because a plurality of these units may be used, depending upon the relative size of the units and of the fluid-bed. Similarly, as shown in FIGS. 1A and 1B, the inlet header(s) may be positioned basally, laterally, and the like, relative to the ebulliating fluid-bed, so long as such header positioning, together with the associated reaction zone holder elements, does not prevent stable fluid-bed operation.

Moreover, as further shown in FIGS. 2A–2E, applicant's invention contemplates, in accordance with the inventive principle, the use of feed injection systems capable of separately introducing an oxidation feed and molecular oxygen-containing gas into contact in the dense fluid-bed phase, thereby generating a local oxidizing condition within the fluid-bed, which is otherwise maintained at a reaction-quenching temperature.

In the operation of the oxidizer unit, as shown in FIG. 1, the fluidized-solid catalyst 11 is introduced into reaction vessel 10 and air or an oxygen-containing gas stream is passed into the reactor through line 13, thereby to establish the fluidized-solid bed. For this purpose, the linear rate of gas flow through the reactor for satisfactory ebulliating fluid-bed operation will be in the range 0.5 to 3.5 ft./sec. The desired bed temperature, $T_1$, is maintained in the fluidized-solid bed by means of the heat exchanger 17 or of the preheat unit 15 or of a combination of these two. In a typical m-xylene ammoxidation for the production of isophthalonitrile and on the basis of 1,000 pounds per hour of m-xylene feed, the reactor is charged with 14,000 pounds of $V_2O_5$ microspheres of about 40–75 micron size to provide a fluidized-bed depth of 12 to 15 feet. Air initially at about 600° F. is passed into the base of the reactor through line 13 at a rate of about 12,000 pounds per hour, but after the reaction has started, the air need not be heated and is conveniently introduced at its ambient temperature. m-Xylene is then passed into the vaporizer-superheater 16, along with about 1,000 pounds per hour of ammonia and 0 to 1,000 pounds per hour of an inert gas, such as steam. In the vaporizer, the m-xylene, together with the ammonia and inert gas, is heated to a temperature in the range 700 to 1100° F., preferably 900 to 1000° F. and then passed into the reactor through line 14.

The vaporized and superheated stream upon passing through the discharge end of line 14 entrains and mixes with the fluidized mixture of air and solid catalyst. Momentarily a local ammoxidizing condition is generated as the result of the admixture, and the condition is terminated not later than the time of passage of the reaction product-generating stream from the exit port of the reaction zone holder. The duration of the generated oxidizing condition is controlled within operational limits by the length of the reaction zone holder and the velocity of the entering gas stream via line 14. While the net linear velocity of the gas stream through the fluid-bed for stable bed operation cannot exceed about 3.0 ft./sec., the velocity of the entering high temperature gas stream may substantially exceed 3.0 ft./sec. and may be as much as 50 or even 500 ft./sec., so long as the near linear velocity through the reactor is no greater than about 3.5 ft./sec.

The reaction product-containing gas stream after leaving the reaction zone holder 18 passes through the balance of the fluid-bed, which is maintained by exchanger 17 at an average bulk catalyst temperature in the range 400 to 650° F., preferably from 500 to 550° F. when ammoxidizing m-xylene, disengaging from the fluid-bed in the void zone in the upper portion of the reactor, thereafter passing into a cyclone 20 or the equivalent, and exits via line 22 for delivery to the product recovery section. Catalyst fines are returned to the reaction zone via line 21.

While one specific process embodying the novel steps of the present invention, as well as one specific apparatus and a modified form of the apparatus for carrying out the same, has been described in detail, it is to be understood that this description is illustrative only and for the purpose of making the invention more clear, and it is not the intent that the invention shall be construed as limited to details of the description.

What is claimed is:

1. In the vapor-phase catalytic fluid-bed ammoxidation of hydrocarbons which are vaporizable and ammoxidizable at a temperature in the range from about 700° F. to 1100° F. at a hydrocarbon to oxygen to ammonia mol ratio in the range from about 1:0.5–50:1–16, respectively, and wherein said catalytic fluid-bed is a fluidized variable valent heavy metal oxide ammoxidation catalyst, thereby producing the corresponding nitrile product, the improvement which comprises heating the continuous phase of said fluid-bed to a temperature $T_1$ defined by the expression:

$$T_1 = T_2 - Y$$

wherein said $T_1$ is a temperature at which said ammoxidation reaction is quenched and which is above the dew point of the resulting reaction product mixture; wherein $T_2$ is the fluid-bed temperature in the range from about 400 to 800° F. at which about a 10% conversion to said nitrile occurs when a gaseous mixture of said hydrocarbon, oxygen, and ammonia having a mole ratio of about 1:3:2 respectively, is introduced at $T_2$ into said fluid-bed at a linear velocity of 2 ft. per second, and wherein Y is a temperature difference in degrees Fahrenheit in the range 100–400; maintaining said fluid-bed temperature, $T_1$, by an indirect heat exchanger, placed in contact with a portion of the downstream fluidized-bed continuous phase, thereafter separately introducing into the upstream portion of said continuous phase said hydrocarbon, ammonia, and a molecular oxygen-containing gas, wherein at least one of said intromittent gas stream is introduced at a temperature in the range of from about 150 to 500° F. higher than said temperature, $T_2$, thereby locally generating in said phase within the zone of initial common contacting of the hydrocarbon, ammonia, oxygen-containing gas and fluidized solid a local ammoxidizing condition, withdrawing from said fluid bed the resulting effluent gas stream containing said nitrile product.

2. The process of claim 1, wherein m-xylene is converted to isophthalonitrile.

3. The process of claim 1, wherein p-xylene is converted to terephthalonitrile.

References Cited

UNITED STATES PATENTS

| | | | |
|---|---|---|---|
| 2,828,325 | 3/1958 | Hardy | 260—465 |
| 2,838,558 | 6/1958 | Hadley et al. | 260—465 |
| 2,846,462 | 8/1958 | Hadley | 260—465 |
| 2,987,538 | 6/1961 | Gasson | 260—465 |
| 3,152,170 | 10/1964 | Barclay et al. | 260—465.3 |
| 3,226,422 | 12/1965 | Sennewald et al. | 260—465.3 |
| 3,254,110 | 5/1966 | Sennewald et al. | 260—465.3 |
| 3,351,634 | 11/1967 | Ellis et al. | 260—346.4 |

OTHER REFERENCES

Hadley, Chemistry and Industry, Feb. 25, 1961, pp. 238–240.

CHARLES B. PARKER, Primary Examiner

S. T. LAWRENCE III, Assistant Examiner

U.S. Cl. X.R.

23—28, 151; 260—464, 465.1, 465.3, 465.9